United States Patent
Park et al.

(10) Patent No.: US 9,193,896 B2
(45) Date of Patent: Nov. 24, 2015

(54) COMPOSITION HAVING ENHANCED CORROSION RESISTANCE AND PH BUFFERING PROPERTY FOR ANTIFREEZE LIQUID OR COOLANT

(75) Inventors: Jae Yoon Park, Seoul (KR); Chang Yeol Jo, Busan (KR); Dong Yeol Choi, Gyeonggi-do (KR)

(73) Assignee: KUKDONG JEYEN COMPANY LIMITED, Gyeonggi-do (KR)

( * ) Notice: Subject to any disclaimer, the term of this patent is extended or adjusted under 35 U.S.C. 154(b) by 0 days.

(21) Appl. No.: 14/346,716

(22) PCT Filed: Jan. 31, 2012

(86) PCT No.: PCT/KR2012/000753
§ 371 (c)(1),
(2), (4) Date: Mar. 22, 2014

(87) PCT Pub. No.: WO2013/042837
PCT Pub. Date: Mar. 28, 2013

(65) Prior Publication Data
US 2014/0223929 A1    Aug. 14, 2014

(30) Foreign Application Priority Data

Sep. 23, 2011  (KR) .................... 10-2011-0096239

(51) Int. Cl.
C09K 5/20   (2006.01)
C23F 11/08  (2006.01)

(52) U.S. Cl.
CPC .. C09K 5/20 (2013.01); C23F 11/08 (2013.01)

(58) Field of Classification Search
CPC ........................................................ C09K 3/18
See application file for complete search history.

(56) References Cited

U.S. PATENT DOCUMENTS 5,085,791 A * 2/1992 Burns .............................. 252/79
2007/0007489 A1 * 1/2007 Egawa et al. .................... 252/71

(Continued)

FOREIGN PATENT DOCUMENTS

JP    S62-4774 A    1/1987
JP    H06-41584 B2  1/1988

(Continued)

OTHER PUBLICATIONS

International Search Report for PCT/KR2012/000753.

*Primary Examiner* — Necholus Ogden, Jr.
(74) *Attorney, Agent, or Firm* — Vorys, Sater, Seymour and Pease LLP (57) ABSTRACT

A composition for the antifireeze liquid or the coolant includes a cyclo hexane dicarboxylic acid, an azole- or thiazole-based inhibitor, and a metal from an element of group 2, group 5, group 6, or group 7. The composition of the present invention has increased corrosion resistance at a lower density by not containing organic additives, and has a better pH buffering property due to enhanced thermal oxidation stability at a high temperature. Even after a long-term operation for over 200000 km, the composition of the present invention maintains a metal corrosion resistance capability, the appearance of a water pump impeller and the inside of a radiator tube including aluminum remains decent, and the composition has a superior corrosion resistance effect with respect to internal metal parts even after an operational test, thereby allowing use of the composition for the antifreeze liquid or the coolant having a long life.

10 Claims, 6 Drawing Sheets

(56) References Cited

U.S. PATENT DOCUMENTS

2008/0141900 A1    6/2008   Huang et al.
2009/0294102 A1*  12/2009   Yang et al. ............... 165/104.19

FOREIGN PATENT DOCUMENTS

| JP | 2007269834 A | 10/2007 |
| KR | 10-2010-0018754 A | 2/2010 |

* cited by examiner

COMPOSITION HAVING ENHANCED CORROSION RESISTANCE AND PH BUFFERING PROPERTY FOR ANTIFREEZE LIQUID OR COOLANT

CROSS REFERENCE TO RELATED APPLICATIONS AND CLAIM OF PRIORITY

This patent application claims benefit under 35 U.S.C. 119(e), 120, 121, or 365(c), and is a National Stage entry from International Application No. PCT/KR2012/000753, filed 31 Jan. 2012, which claims priority to Korean Patent Application No. 10-2011-0096239, filed 23 Sep. 2011, entire contents of which are incorporated herein by reference.

BACKGROUND

1. Technical Field

The present invention relates to a composition for an antifreeze or a coolant, containing (a) cyclohexane dicarboxylic acid; (b) an azole- or thiazole-based inhibitor; and (c) a metal of group II, V, VI, or VII element.

2. Background Art

Generally, a composition for an antifreeze or a coolant contains, as a main material, ethylene glycol or propylene glycol. The composition contains, as main components, a carboxylic additive and an organic material in order to prevent corrosion of aluminum- and iron-based parts. Aliphatic polybasic acid type surfactants (Japanese Patent Publication No. 2002-38137), dicarboxylic or tricarboxylic acid having $C_{10}$-$C_{20}$ alkyl group (Japanese Patent Publication No. 2000-219981), flavone derivatives (Japanese Patent Publication No. 2001-98258), polymaleic acid, polyacrylic acid, or copolymers of their monomers (Japanese Patent Publication No. 2001-279235), lithium compounds (Japanese Patent Publication No. Hei 9-263976), and the like have been reported as anti-corrosive agents for the aluminum- and iron-based parts.

On the other hand, since only the combination of carboxylic and organic additives cannot have anti-corrosive durability at low concentrations of 30% or less, a phosphate or silicate additive (U.S. Pat. Nos. 4,873,011, 5,422,026, 4,598,205, 4,657,689, 4,647,392, and 5,064,552) is used as a supplement agent. However the phosphate and silicate additives have faults of a fast depletion rate and bad stability. The phosphate additive reacts with calcium or magnesium ions, which may be contained in the antifreeze or coolant dilution water, to form calcium phosphate and magnesium phosphate which are insoluble in water, thereby causing blockage and corrosion due to scale and hindering the long-term anti-corrosion for aluminum- and iron-based parts. Silicate may be easily gelled due to its poor stability, may generate abrasive $SiO_2$ particles, resulting in a loss of anti-corrosive capability, thereby accelerating abrasion of mechanical seals of the water pump to cause a liquid to leak, or may block the core of the radiator by precipitation, causing an overheating phenomenon.

Throughout the entire specification, many patent documents are referenced and their citations are represented. The disclosures of cited patent documents are entirely incorporated by reference into the present specification, and the level of the technical field within which the present invention falls and details of the present invention are explained more clearly.

SUMMARY

The present inventors endeavored to develop an antifreeze or a coolant having an excellent anti-corrosive capability at low concentrations and excellent pH buffering capability at high temperatures. Specifically, the present inventors endeavored to solve a problem of a sudden deterioration in anti-corrosive capability at low concentrations even without using phosphate or silicate, and endeavored to prevent a sudden decrease in pH due to the long-term thermal oxidation at high temperatures. As a result, the present inventors established that a composition containing cyclohexane dicarboxylic acid, an azole- or thiazole-based inhibitor, and a metal of Group II, V, VI, or VII element exhibited superior effects in anti-corrosive capability and pH buffering capability, and then completed the present invention.

Accordingly, an aspect of the present invention is to provide a composition for an antifreeze or a coolant.

Other purposes and advantages of the present disclosure will become clarified by the following detailed description of invention, claims, and drawings.

DETAILED DESCRIPTION

In accordance with an aspect of the present invention, there is provided a composition for an antifreeze or a coolant, the composition including: (a) cyclohexane dicarboxylic acid; (b) an azole- or thiazole-based inhibitor; and (c) a metal of Group II, V, VI, or VII element.

The present inventors endeavored to develop an antifreeze or coolant having excellent anti-corrosive performance at low concentrations and excellent pH buffering performance at high temperatures. Specifically, the present inventors endeavored to solve a problem of a sudden deterioration in anti-corrosive performance at low concentrations even without using phosphate or silicate, and endeavored to prevent a sudden decrease in pH due to the long-term thermal oxidation at high temperatures. As a result, the present inventors established that a composition containing cyclohexane dicarboxylic acid, an azole- or thiazole-based inhibitor, and a metal of Group II, V, VI, or VII element exhibited superior effects in anti-corrosive performance and pH buffering performance.

The composition of the present invention includes (a) cyclohexane dicarboxylic acid; (b) an azole- or thiazole-based inhibitor; and (c) a metal of Group II, V, VI, or VII element. The contents of the above components are not particularly limited. Preferably, the composition of the present invention contains 5-50 parts by weight of the azole- or thiazole-based inhibitor and 0.5-5 parts by weight of the metal of Group II, V, VI, or VII element, based on 100 parts by weight of the cyclohexane dicarboxylic acid.

The composition of the present invention generally contains glycol used as an anti-freezing agent. The composition of the present invention containing glycol may contain 70-98 wt % (more preferably, 85-98 wt %) of the glycol, 0.1-20 wt % (more preferably, 0.1-14.0 wt %) of the cyclohexane dicarboxylic acid, 0.01-10 wt % (more preferably, 0.01-1.0 wt %) of the azole- or thiazole-based inhibitor, and 0.001-0.6 w % of the metal of Group II, V, VI, or VII element.

The glycol used as an anti-freezing agent in the composition of the present invention serves to prevent the freezing and bursting of engines and cooling systems, and includes one or a mixture of two or more selected from the group consisting of ethylene glycol, propylene glycol, diethylene glycol, dipropylene glycol, glycerin, triethylene glycol, tripropylene glycol, 1,3-butylene glycol, and hexylene glycol. The use content of the glycol is preferably 70-98 wt %, and more preferably 85-98 wt %. Less than 70 wt % of the glycol may cause the freezing and bursting of engines and cooling systems at sub-zero temperatures in the winter, and may cause the boiling of the coolant in the engines at high outdoor temperatures in the summer. On the other hand, more than 98 wt % of the glycol may cause a scarcity of an anti-corrosive agent, resulting in a difficulty in exhibiting the long-term anti-corrosive performance.

According to a preferable embodiment of the present invention, the cyclohexane dicarboxylic acid used as an anti-corrosive agent on aluminum- and iron-based parts in the composition of the present invention serves to protect various kinds of metallic parts inside the cooling system against corrosion for a long time. Here, one or a mixture of two or more selected from the group consisting of 1,4-cyclohexane dicarboxylic acid, 1,3-cyclohexane dicarboxylic acid, and 1,2-cyclohexane dicarboxylic acid may be used. The use content of the cyclohexane dicarboxylic acid contained in the composition of the present invention is preferably 0.1-20 wt %, and more preferably 0.1-14.0 wt %. If the content of the cyclohexane dicarboxylic acid is less than 0.1 wt %, such a small content cannot give an expectation of sufficient anti-corrosive effects on the aluminum- and iron-based parts. If the content of the cyclohexane dicarboxylic acid is more than 20 wt %, such an excessive content may cause a deterioration in the liquid stability, an excessive time for dissolution, and a decrease in economic feasibility.

According to a preferable embodiment of the present invention, the azole- or thiazole-based inhibitor used as an anti-corrosive agent on copper or brass in the composition of the present invention exhibits an anti-corrosive performance on copper alloy parts inside the cooling system. Here, one or a mixture of two or more selected from the group consisting of tolyltriazole, benzotriazole, 4-phenyl-1,2,3-triazole, 2-naphthotriazole, 4-nitrobenzotriazole, and 2-mercaptobenzotriazole may be used. Preferably, one or a mixture of two or more may be selected from the group consisting of tolyltriazole and benzotriazole may used. The use content of the azole- or thiazole-based inhibitor contained in the composition of the present invention is preferably 0.01-10.0 wt %, and more preferably 0.01-1.0 wt %. Less than 0.01 wt % of the azole- or thiazole-based inhibitor may not exhibit an anti-corrosive performance on copper and brass parts. More than 10.0 wt % of the azole- or thiazole-based inhibitor is economically infeasible and may cause corrosion on the iron-based parts.

According to a preferable embodiment of the present invention, ions of inorganic elements are used to improve anti-corrosive performance at low concentrations, and have a synergistic effect when used in combination with cyclohexane dicarboxylic acid. The inorganic elements are: preferably, Group II, V, VI, or VII elements; more preferably, barium, strontium, magnesium, vanadium, niobium, molybdenum, chrome, and manganese; still more preferably, barium, strontium, and magnesium, which are Group II elements, and manganese, which is a Group VII element; and most preferably barium, strontium, and manganese. The preferable use content of the inorganic element is 0.001-0.6 wt %. Less than 0.001 wt % of the inorganic element cannot be expected to exhibit a sufficient anti-corrosive effect due to a small content thereof. More than 0.6 wt % of the inorganic element may cause a deterioration in the liquid stability, resulting in corrosion on the iron parts and soldered parts, thereby exhibiting an adverse effect in the long-term anti-corrosive performance.

An example of alkali metal hydroxide, which is used to adjust the pH range to 7-9 in order to allow the composition of the present invention to have excellent pH buffering performance at high temperatures, is potassium hydroxide or sodium hydroxide, and more preferably potassium hydroxide. The foregoing alkali metal hydroxide is contained in a content of preferably 0.5-4.5 wt %, more preferably 1.0-4.0 wt %, and most preferably 1.5-3.5 wt %. The composition of the present invention may be prepared by further adding, besides the above components, a defoaming agent, a dye, and ion-exchanged water.

As described above, the present invention is mainly characterized in that the cyclohexane dicarboxylic acid, the azole- or thiazole-based inhibitor, and the Group II, V, VI, or VII element, which are contained in the composition of the present invention, solve the problem of a sudden deterioration in anti-corrosive performance at low concentrations and prevent a sudden decrease in pH due to the long-term thermal oxidation at high temperatures.

Features and advantages of the present invention are summarized as follows:

(a) The present invention provides a composition for an antifreeze or a coolant, the composition containing cyclohexane dicarboxylic acid, an azole- or thiazole-based inhibitor, and a metal of Group II, V, VI, or VII element.

(b) Generally, phosphate and silicate, which are organic additives added to carboxylic acid as an anti-corrosive agent, have a fast depletion rate and poor stability, thereby causing blockage and corrosion due to scale, blocking a radiator core to cause an overheating phenomenon, and hindering the long-term anti-corrosive performance on aluminum- and iron-based parts. However, the composition of the present invention improves anti-corrosive performance at low concentrations and thermal stability at high temperatures, thereby improving pH buffering performance, by using ions of inorganic elements without an organic additive.

(c) The composition of the present invention maintains its metal anti-corrosive performance even after long-term driving of 200,000 km or longer, thereby keeping good conditions of both an appearance of a water pump impeller and an appearance of aluminum-based radiator tubes and having excellent effects in anti-corrosion of internal metal parts even in the long-term real car driving. Therefore, the composition of the present invention can be used as a composition for a long-lifespan freeze or coolant.

Hereinafter, the present invention will be described in detail with reference to examples. These examples are only for illustrating the present invention more specifically, and it will be apparent to those skilled in the art that the scope of the present invention is not limited by these examples.

EXAMPLES

Throughout the present specification, the term "%" used to express the concentration of a specific material, unless otherwise particularly stated, refers to (weight/weight)% for solid/solid, (weight/volume)% for solid/liquid, and (volume/volume)% for liquid/liquid.

Preparative Example 1

Preparation of Antifreeze or Coolant of Examples 1 to 5

The present inventors used 90-95 wt % of glycol (e.g., ethylene glycol) as a main component for preparation of an antifreeze or a coolant. 1.0-5.0 wt % of cyclohexane dicarboxylic acid was used as an anti-corrosive agent on aluminum- and iron-based materials, and 0.1-0.5 wt % of azole or thiazole was used as an anti-corrosive agent on copper and brass materials. As a main characteristic of the present invention, 0.02-0.04 wt % of inorganic elements (strontium (Tokyo Chemical Industry, Japan), manganese (Basf, Germany), and barium (Sigma-Aldrich, Canada)) were used in combination with cyclohexane dicarboxylic acid to improve the corrosion resistance of an antifreeze or a coolant at low concentrations. In addition, 0.5-4.0 wt % of calcium hydroxide was used in order to allow the composition of the present invention to have pH buffering performance. Specifically, compositions of examples and comparative examples of the present invention were prepared by weighing components of which contents are shown in Table 1 below, putting ethylene glycol into the container, and then heating the solution to reach a temperature of 40-60° C. while stirring was conducted for a homogeneous solution.

TABLE 1

Compositions of examples and comparative examples of the present invention

| Component (wt %) | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Ethylene glycol | 91.77 | 91.09 | 90.48 | 90.67 | 92.76 | 91.7 | 93.7 | 91.0 | 92.9 | 92.8 |
| 2-ethyl hexanoic acid | 2.0 | — | 2.5 | — | — | 3.0 | — | 2.5 | — | — |
| Sodium benzoate | — | 3.5 | — | 3.0 | — | — | 3.5 | — | 4.8 | — |
| Sebacic acid | 2.0 | 1.0 | — | 1.2 | — | 2.0 | 1.0 | 1.8 | 1.2 | — |
| Decanedicarboxylic acid | — | 0.5 | 1.2 | — | — | — | 0.5 | 1.2 | — | — |
| Cyclohexanedicarboxylic acid | 1.0 | 1.8 | 2.2 | 1.8 | 4.2 | — | — | — | — | 4.2 |
| Tolyltriazole | 0.3 | 0.2 | 0.3 | 0.4 | — | 0.3 | 0.2 | 0.3 | 0.4 | — |
| Benzotriazole | 0.1 | 0.2 | — | — | 0.3 | 0.1 | 0.2 | — | — | 0.3 |
| 2-mercaptobenzothiazole | — | — | 0.1 | — | 0.1 | — | — | 0.1 | — | 0.1 |
| Potassium hydroxide | 2.8 | 1.7 | 3.2 | 2.9 | 2.6 | 2.9 | 0.9 | 3.1 | 0.7 | 2.6 |
| Strontium | 0.03 | — | — | — | 0.04 | — | — | — | — | — |
| Barium | — | 0.04 | — | 0.03 | — | — | — | — | — | — |
| Manganese | — | — | 0.02 | — | — | — | — | — | — | — |

Test Example 1

Metal Corrosion Test

For a metal corrosion test, the compositions of examples and comparative examples were mixed with combination water defined in the KS M 2142 metal corrosion test (solution in which sulfuric anhydride 148 mg, sodium chloride 165 mg, and sodium hydrogen carbonate 138 mg are dissolved in 1 l of distilled water) to reach concentrations of 30% and 20%, respectively. 750 ml and of each of the mixed solutions and one set of metal test specimens were put in a tall beaker. A thermometer, a vent pipe, and a cooling pipe were attached to a heater. Then, while dried air was allowed to flow in the liquid at a flow rate of 100±10 ml and per minute, the 336 h- and 672 h-metal corrosion evaluations were conducted when the antifreeze temperature was 98+2° C. Upon the completion of the test, the test specimens were washed with acid. The weight changes of the test specimens were determined in the unit of 0.1 mg, and the results were tabulated in Table 2.

TABLE 2

Results of Metal Corrosion Test

| Test item | | Standard | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|---|
| Weight change of test specimen ($mg/cm^2$) 30%, 98° C., | Aluminum | ±0.30 | −0.07 | −0.04 | −0.06 | −0.06 | −0.04 | −0.09 | −0.06 | −0.07 | −0.07 | −0.06 |
| | Cast ion | ±0.15 | +0.01 | −0.03 | +0.02 | −0.01 | −0.04 | −0.01 | +0.03 | −0.02 | +0.02 | −0.05 |
| | Steel | ±0.15 | −0.01 | −0.02 | −0.01 | +0.01 | −0.03 | −0.01 | −0.01 | +0.01 | −0.01 | −0.02 |
| | Brass | ±0.15 | +0.02 | −0.02 | +0.03 | −0.02 | −0.05 | −0.02 | −0.02 | +0.02 | −0.03 | −0.05 |
| | Solder | ±0.30 | −0.09 | −0.07 | −0.07 | −0.08 | −0.06 | −0.10 | −0.09 | −0.07 | −0.08 | −0.07 |

TABLE 2-continued

Results of Metal Corrosion Test

| | | | Example | | | | | Comparative Example | | | |
|---|---|---|---|---|---|---|---|---|---|---|---|
| Test item | | Standard | 1 | 2 | 3 | 4 | 5 | 1 | 2 | 3 | 4 | 5 |
| and 336 hours | Copper | ±0.15 | −0.04 | −0.03 | −0.04 | −0.02 | −0.04 | +0.03 | −0.02 | +0.03 | −0.03 | −0.03 |
| Appearance of test specimen | | | Not corroded | | | | | Not corroded | | | | |
| Weight change of test specimen (mg/cm$^2$) 20%, 98° C., and 672 hours | Aluminum | ±0.30 | −0.13 | −0.08 | −0.13 | −0.14 | −0.07 | −0.42 | −0.54 | −0.62 | −0.45 | −0.32 |
| | Cast ion | ±0.15 | −0.04 | −0.05 | −0.03 | +0.03 | −0.08 | −0.26 | −0.27 | +0.25 | −0.25 | −0.29 |
| | Steel | ±0.15 | −0.03 | −0.03 | +0.02 | −0.03 | −0.04 | −0.09 | +0.11 | −0.11 | −0.11 | +0.12 |
| | Brass | ±0.15 | +0.04 | −0.02 | −0.06 | −0.02 | −0.08 | −0.10 | −0.08 | −0.10 | +0.07 | −0.12 |
| | Solder | ±0.30 | −0.14 | −0.09 | −0.15 | −0.13 | −0.18 | −0.31 | −0.25 | −0.40 | −0.36 | −0.33 |
| | Copper | ±0.15 | +0.03 | −0.05 | −0.09 | +0.04 | −0.09 | +0.08 | −0.10 | −0.12 | −0.06 | −0.13 |
| Appearance of test specimen | | | Not corroded | | | | | Aluminum and solder corroded | Aluminum and solder corroded | Aluminum and solder corroded | Aluminum and solder corroded | Cast ion and solder corroded |

As can be seen from Table 2 above, with regard to the solution of 300—a generally used concentration—for the metal corrosion test, all the results for the compositions of the examples and comparative examples were satisfactory without corrosion. With regard to the low concentration solution of 20% for the metal corrosion test, the compositions of the examples exhibited satisfactory anti-corrosive performance, but the compositions of the comparative examples caused great changes in weights of aluminum and cast iron or induced corrosion thereof. Therefore, it can be seen that the compositions of the comparative examples had poor anti-corrosive performance at low concentrations.

Test Example 2

Aluminum Casting Heating Surface Corrosion Test

For comparison of anti-corrosive performance for aluminum castings around an engine head and a cylinder block at high temperatures, the compositions were diluted with distilled water to reach concentrations of 20% and 25%, respectively. 165 mg of sodium chloride was dissolved in each of the dilution solutions, followed by homogenous mixing. 500 ml and of aliquot from each of the mixtures was injected into the apparatus in which a heat-resistant glass cell was assembled between a test specimen and an upper assembling plate by using an O-ring. Heating was conducted in the compressed air under a pressure of 150 KPa, such that the final pressure was 193 KPa when the test temperature reached 135±2° C. These conditions were maintained for 168±2 hours and 336±2 hours, respectively. Upon the completion of the test, the test specimens were treated. The weight changes of the test specimens were determined in the unit of 0.1 mg, and the results were tabulated in Table 3.

TABLE 3

Results on aluminum casting heating surface corrosion test

| | | Example | | | | | Comparative Example | | | | |
|---|---|---|---|---|---|---|---|---|---|---|---|
| Test item | Standard | 1 | 2 | 3 | 4 | 5 | 1 | 2 | 3 | 4 | 5 |
| Weight change of test specimen (mg/cm$^2$) 25% × 7 days | ±1.0 | −0.12 | −0.07 | −0.16 | −0.13 | −0.08 | −0.68 | −0.72 | −0.84 | −0.78 | −0.69 |
| Appearance of aluminum casting specimen | | Not corroded | | | | | Not corroded | | | | |
| Weight change of test specimen (mg/cm$^2$) 20% × 14 days | ±1.0 | −0.17 | −0.11 | −0.23 | −0.19 | −0.14 | −1.34 | −1.62 | −1.34 | −1.52 | −1.24 |
| Appearance of aluminum casting specimen | | Not corroded | | | | | Corroded | Corroded | Corroded | Corroded | Corroded |

As can be confirmed from Table 3 above, the compositions of the examples showed no corrosion and satisfactory changes in weight at both the general concentration and the low concentration. However, the compositions of the comparative examples showed relatively great changes in weight, and showed great changes in weight due to corrosion at the low concentration.

Test Example 3

Cyclic Corrosion Test

For a cyclic corrosion test, three sets of metal test specimens were put in a cyclic corrosion testing circulator tank while a combination water defined in the KS M 2142 metal corrosion test (a solution in which sulfuric anhydride 148 mg, sodium chloride 165 mg, and sodium hydrogen carbonate 138 mg) was used. A radiator, a heat coater, and a water pump were attached to the circulator tank. The flow rate was set to 60 l/min. The compositions of the examples and comparative examples were diluted to concentrations of 30% and 20%, respectively. The test was conducted at a test temperature of 98° C. for 1,000 hours and 2,000 hours. Test results for the three sets of metal test specimens were averaged in the unit of 0.1 mg, and the results were tabulated in Table 4.

examples showed great changes in weight for aluminum, brass, and solder. With regard to the low-concentration solution of 20% for the cyclic corrosion test, the compositions in the examples showed excellent anti-corrosive performance, but the compositions in the comparative examples caused corrosion on aluminum and cast iron and showed great changes in weight for solder and brass. Therefore, it can be seen that the compositions of the comparative examples had a remarkably deteriorated anti-corrosive performance at the low concentration.

Test Example 4

Test on pH Buffering Performance at High Temperature

This test was conducted to evaluate the pH buffering performance and anti-oxidizing power of an antifreeze having a predetermined dilution ratio, and was based on a thermal stability test at a high temperature according to the PSA standard D55 5345. 650 ml and of an antifreeze diluted with distilled water to a concentration of 40% and a cast iron ring test specimen were put in a well-washed aluminum pressure container. While stirring was conducted at 500 rpm for 384

TABLE 4

Results of cyclic corrosion test

| Test item | | Standard | Example 1 | 2 | 3 | 4 | 5 | Comparative example 1 | 2 | 3 | 4 | 5 |
|---|---|---|---|---|---|---|---|---|---|---|---|---|
| Weight change of test specimen (mg/cm$^2$) 30%, 98° C., and 1,000 hours | Aluminum | ±0.60 | −0.12 | −0.10 | −0.11 | −0.12 | −0.08 | −0.26 | −0.27 | −0.30 | −0.31 | −0.25 |
| | Cast iron | ±0.30 | −0.04 | −0.06 | −0.06 | −0.05 | −0.13 | −0.10 | −0.11 | −0.10 | −0.11 | −0.19 |
| | Steel | ±0.30 | −0.03 | −0.03 | −0.04 | −0.04 | −0.05 | −0.08 | −0.07 | −0.10 | −0.10 | −0.12 |
| | Brass | ±0.30 | −0.07 | −0.04 | −0.09 | −0.03 | −0.13 | −0.12 | +0.08 | −0.14 | +0.07 | −0.18 |
| | Solder | ±0.60 | −0.14 | −0.09 | −0.15 | −0.13 | −0.18 | −0.26 | −0.21 | −0.27 | −0.28 | −0.34 |
| | Copper | ±0.30 | +0.04 | −0.05 | −0.09 | +0.04 | −0.09 | +0.10 | −0.11 | −0.14 | +0.11 | −0.15 |
| Appearance of test specimen | | | Not corroded | | | | | Not corroded | | | | |
| Weight change of test specimen (mg/cm$^2$) 20%, 98° C., and 2,000 hours | Aluminum | ±0.60 | −0.16 | −0.14 | −0.16 | −0.17 | −0.12 | −0.63 | −0.68 | −0.69 | −0.70 | −0.59 |
| | Cast iron | ±0.30 | −0.07 | −0.09 | −0.08 | −0.08 | −0.22 | −0.24 | −0.28 | −0.25 | −0.26 | −0.43 |
| | Steel | ±0.30 | −0.04 | +0.04 | −0.08 | −0.09 | −0.09 | −0.16 | +0.18 | −0.20 | −0.20 | −0.26 |
| | Brass | ±0.30 | −0.15 | −0.10 | −0.18 | −0.09 | −0.13 | −0.25 | −0.31 | −0.34 | −0.33 | −0.36 |
| | Solder | ±0.60 | −0.27 | −0.15 | −0.26 | −0.17 | −0.29 | −0.71 | −0.73 | −0.80 | −0.69 | −0.85 |
| | Copper | ±0.30 | −0.18 | −0.11 | −0.12 | −0.08 | −0.16 | −0.22 | −0.21 | −0.20 | −0.19 | −0.31 |
| Appearance of test specimen | | | Not corroded | | | | | Aluminum and solder corroded | Aluminum and solder corroded | Aluminum and solder corroded | Aluminum and solder corroded | Aluminum, cast iron, and solder corroded |

As can be seen from Table 4 above, with regard to the solution of 30%—a generally used concentration—for the cyclic corrosion test, all the compositions in the examples and comparative examples showed no corrosion and favorable changes in weight, but the compositions in the comparative hours at a temperature of 160° C., aliquots were taken at an interval of a predetermined period of time, followed by pH measurement, thereby evaluating the pH buffering performance. The results were tabulated in Table 5 and FIGS. 2A through 2J.

TABLE 5

Test results on pH buffering performance at high temperature

| Test item | | Example | | | | | Comparative example | | | | |
|---|---|---|---|---|---|---|---|---|---|---|---|
| | | 1 | 2 | 3 | 4 | 5 | 1 | 2 | 3 | 4 | 5 |
| Elapse time after test | 0 | 8.05 | 8.10 | 8.07 | 8.07 | 8.11 | 8.12 | 8.08 | 8.05 | 8.08 | 8.10 |
| | 8 | 8.02 | 8.05 | 8.03 | 8.03 | 8.07 | 8.07 | 8.05 | 8.03 | 8.04 | 8.07 |
| | 24 | 7.98 | 8.02 | 8.01 | 8.02 | 8.04 | 8.02 | 8.00 | 7.99 | 8.00 | 8.03 |
| | 48 | 7.96 | 7.98 | 8.00 | 8.02 | 8.03 | 7.93 | 7.92 | 7.92 | 7.93 | 7.96 |
| | 72 | 7.95 | 7.96 | 8.00 | 8.01 | 8.00 | 7.85 | 7.85 | 7.84 | 7.85 | 7.88 |
| | 144 | 7.94 | 7.95 | 7.97 | 7.99 | 7.99 | 7.57 | 7.54 | 7.55 | 7.56 | 7.58 |
| | 192 | 7.93 | 7.94 | 7.96 | 7.98 | 7.97 | 7.17 | 7.16 | 7.18 | 7.19 | 7.20 |
| | 240 | 7.92 | 7.93 | 7.94 | 7.96 | 7.95 | 6.80 | 6.81 | 6.78 | 6.83 | 6.87 |
| | 288 | 7.88 | 7.90 | 7.91 | 7.95 | 7.93 | 6.42 | 6.44 | 6.39 | 6.35 | 6.40 |
| | 336 | 7.84 | 7.85 | 7.86 | 7.91 | 7.90 | 6.06 | 6.05 | 6.00 | 5.94 | 6.02 |
| | 384 | 7.78 | 7.81 | 7.80 | 7.86 | 7.87 | 5.84 | 5.80 | 5.81 | 5.76 | 5.62 |
| Appearance of test specimen | Aluminum | Not corroded | | | | | Corroded | Partially corroded | Corroded | Corroded | Partially corroded |
| | Cast iron | Not corroded | | | | | Not corroded | | | | |
| Precipitate in liquid (mL) | | 0.12 | 0.10 | 0.12 | 0.11 | 0.10 | 0.2 | 0.15 | 0.15 | 0.18 | 0.2 |

As can be confirmed from Table 5 above, as for the examples, the change in pH with the lapse of time at a high temperature was relatively small, and thus it can be seen that the compositions of the examples had excellent pH buffering performance, and excellent anti-corrosive performance on aluminum and cast iron materials. As for the comparative examples, the change in pH was great; the pH buffering performance was deteriorated with the lapse of time; and the anti-corrosive performance on aluminum and cast iron at a high temperature was remarkably deteriorated. The slopes of the pH in the comparative examples were steeper than those in the examples (in FIGS. 2A-2J, the X axis represents the passage of time, and the Y axis represents the pH value at a corresponding time).

Test Example 5

Test on Metal Anti-Corrosion Test at Low Concentration

In order to observe the anti-corrosive performance of the composition of the present invention for iron- and aluminum-based materials at a low concentration, which is lower than the general use concentration, the metal anti-corrosion (dynamic corrosion) test defined in the PSA standard was utilized. For the test, the composition was mixed with the combination water defined in the KS M 2142 metal corrosion test (a solution in which sulfuric anhydride 148 mg, sodium chloride 165 mg, and sodium hydrogen carbonate 138 mg are dissolved in 1 l of distilled water) to reach concentration of 20%, which is lower than the general use concentration. Heating surface specimens of aluminum casting and cast iron were installed. Test was conducted for 144 hours while the flow rate was set to 300 m/sec; the temperature of the heating surface 140° C.; and the temperature of the heating block 215° C. A pressure of 1.2 KPa was applied to the system. Each of the heating surface specimens was washed with acid. The weights of the test specimens were determined in the unit of 0.1 mg, and the results were tabulated in Table 7.

TABLE 7

Test results on metal anti-corrosion at low concentration

| Item | | Standard | Example | | | | | Comparative example | | | | |
|---|---|---|---|---|---|---|---|---|---|---|---|---|
| | | | 1 | 2 | 3 | 4 | 5 | 1 | 2 | 3 | 4 | 5 |
| Weight change of test specimen (mg) | Aluminum | ±80 | −34.5 | −16.8 | −22.3 | −23.9 | −14.3 | −82.1 | −79.3 | −78.3 | −85.6 | −72.4 |
| | Cast iron | ±40 | −14.7 | −11.3 | −17.1 | −15.8 | −23.4 | −35.6 | −40.7 | −34.5 | −32.8 | −54.2 |
| Appearance of test specimen | Aluminum | | Not corroded | | | | | Corroded | Partially corroded | Corroded | Partially corroded | Corroded |
| | Cast iron | | Not corroded | | | | | Corroded | | Partially corroded | | Corroded |

As can be confirmed from Table 7, it can be seen that the compositions of the examples showed satisfactory changes in weight for aluminum and cast iron, and thus had anti-corrosive effects on aluminum and cast iron. The compositions of the comparative examples showed great changes in weight for aluminum and cast iron and caused corrosion. Therefore, it can be seen that the compositions of the comparative examples were remarkably deteriorated as compared with the compositions of the present invention in view of anti-corrosion at a high temperature and a low concentration.

Test Example 6

200,000-km Practical Driving Test

The composition for an antifreeze or a coolant of Example 5 was mixed with tap water to reach a concentration of 50%, so that evaluation was made at a use concentration of the practical vehicle. In order to compare the changes of physical properties of the vehicle antifreeze, general physical properties such as an appearance, pH, and a reserve alkalinity change (%), were measured. The concentration changes of metal ions, such as Fe, Cu, Al, and Zn, which are generated when a corrosive reaction occurs by a physicochemical reaction of an antifreeze and various parts of the cooling device, were measured to evaluate the elution degree of corrosive ions of the antifreeze, thereby evaluating long-term durability.

In order to evaluate the depletion degree of the anti-corrosive agent of the antifreeze, the antifreeze was taken from the vehicle after the practical driving, and then used to conduct a metal corrosion test and an aluminum heating surface corrosion test, thereby evaluating whether or not the antifreeze retains anti-corrosive durability even after the practical driving of 200,000 km. After the practical driving of 200,000 km or longer, the cooling system in the practical driving test vehicle was disassembled and the corrosion degrees of parts were observed, thereby evaluating durability thereof. The results of 200,000-km practical driving test were tabulated in Table 8.

TABLE 8

Results of 200,000-km practical driving test

| Test item | | Vehicle No. | | | | | | | | | |
|---|---|---|---|---|---|---|---|---|---|---|---|
| | | 1 | 2 | 3 | 4 | 5 | 6 | 7 | 8 | 9 | 10 |
| Traveling item | Traveling period (month) | 8 | 8 | 8 | 8 | 8 | 8 | 8 | 8 | 8 | 8 |
| | Traveling distance (km) | 217832 | 209874 | 210038 | 209756 | 200987 | 219622 | 206178 | 201002 | 210654 | 218237 |
| | Concentration (v/v %) | 49.8 | 51.1 | 50.8 | 50.1 | 49.5 | 49.3 | 50.4 | 51.0 | 49.2 | 50.0 |
| General feature | Appearance | Satisfactory | Satisfactory | Satisfactory | Satisfactory | Satisfactory | Satisfactory | Satisfactory | Satisfactory | Satisfactory | Satisfactory |
| | pH | 7.68 | 7.69 | 7.73 | 7.70 | 7.75 | 7.79 | 7.74 | 7.75 | 7.74 | 7.75 |
| | Reserve alkalinity change (%) | 7.2 | 6.8 | 6.5 | 7.3 | 7.4 | 7.8 | 6.2 | 7.0 | 6.7 | 7.2 |
| | Precipitation volume (mL) | 0.12 | 0.15 | 0.12 | 0.12 | 0.13 | 0.09 | 0.12 | 0.09 | 0.10 | 0.10 |
| Metal ion concentration (ppm) | Fe | 4.2 | 3.8 | 4.3 | 4.3 | 5.0 | 4.3 | 4.0 | 4.7 | 4.8 | 6.2 |
| | Cu | 3.4 | 3.7 | 4.0 | 3.6 | 4.1 | 3.4 | 3.7 | 4.0 | 3.6 | 4.1 |
| | Al | 3.6 | 3.9 | 4.2 | 3.5 | 2.9 | 3.7 | 3.9 | 4.5 | 4.2 | 3.3 |
| | Zn | 1.5 | 1.9 | 1.7 | 1.6 | 2.2 | 1.7 | 1.9 | 1.9 | 1.5 | 2.7 |
| Metal corrosion (mg/cm$^2$) 98° C. × 336 hr | aluminum | −0.04 | −0.03 | −0.03 | −0.03 | −0.02 | −0.03 | −0.03 | −0.04 | −0.02 | −0.02 |
| | Cast iron | +0.02 | +0.03 | −0.04 | −0.03 | −0.06 | −0.03 | +0.02 | −0.04 | −0.05 | −0.03 |
| | Steel | −0.02 | +0.01 | +0.01 | −0.02 | −0.02 | −0.01 | −0.01 | −0.01 | +0.02 | −0.02 |
| | Brass | −0.05 | −0.05 | −0.06 | +0.04 | −0.07 | −0.06 | −0.06 | −0.05 | −0.04 | −0.07 |
| | Solder | −0.12 | −0.11 | −0.12 | −0.14 | −0.12 | −0.13 | −0.12 | −0.13 | −0.11 | −0.14 |
| | Copper | −0.05 | −0.03 | −0.04 | −0.08 | −0.03 | −0.03 | −0.03 | −0.04 | −0.05 | −0.04 |

Figure 1:
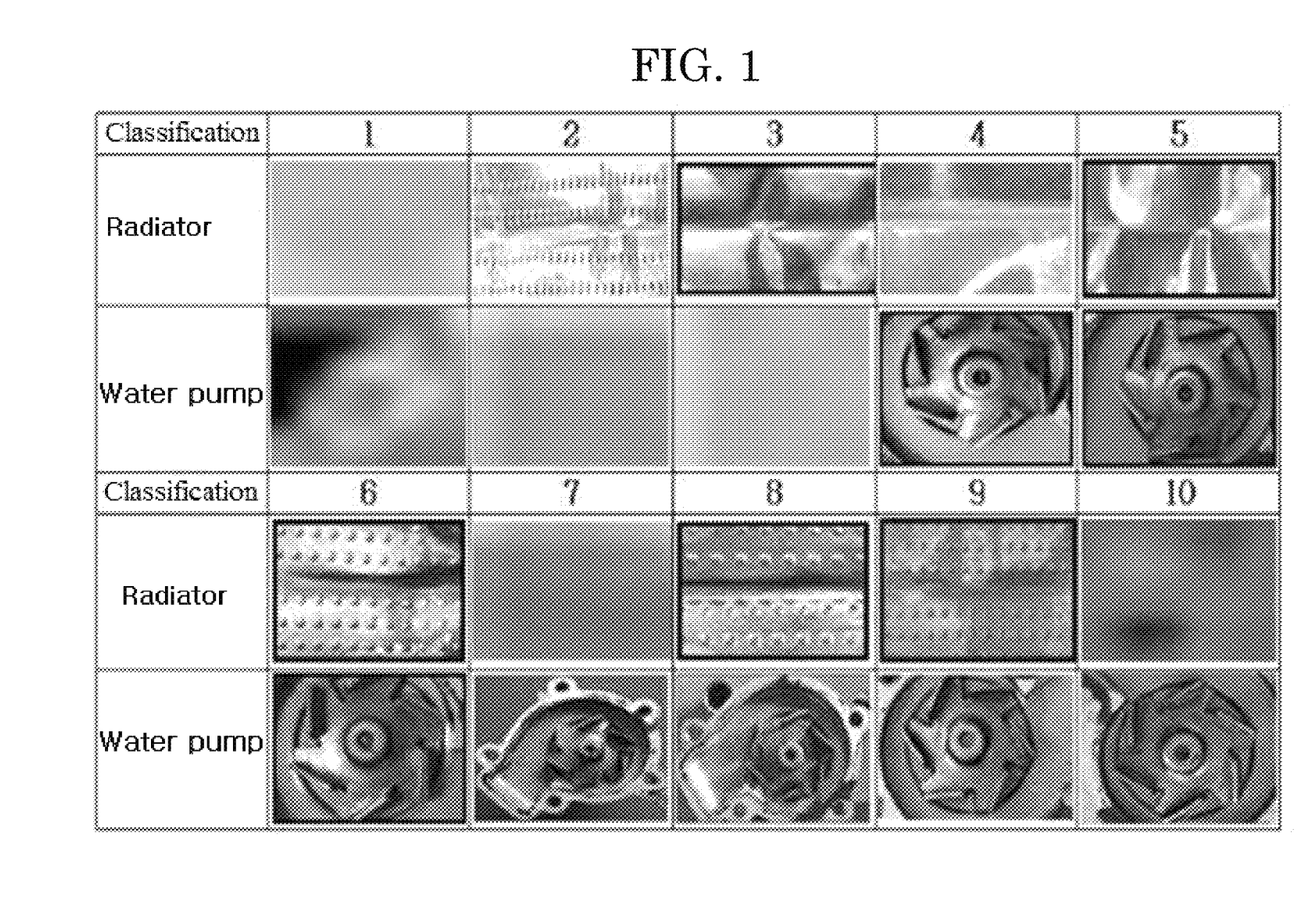
FIG. 1 depicts appearance images of internal parts after the practical driving test of 200,000 km in cases where a composition of Example 5 was applied to ten test vehicles.
Figure 2A:
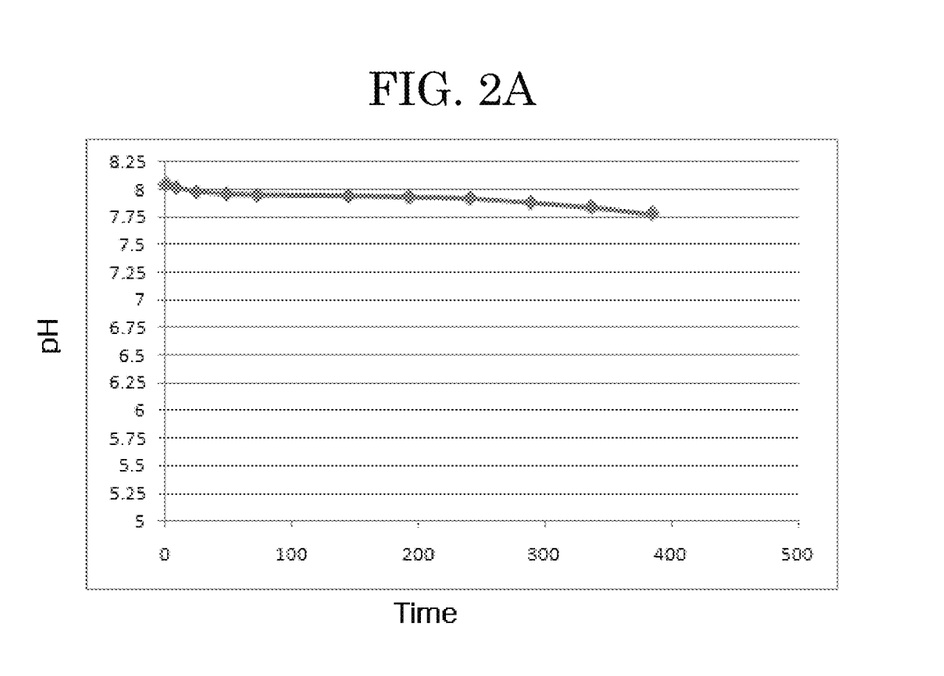
FIGS. 2A, 2C, 2E, 2G and 2I are graphs showing the change in pH over the time in Examples 1, 2, 3, 4 and 5, respectively.
Figure 2B:
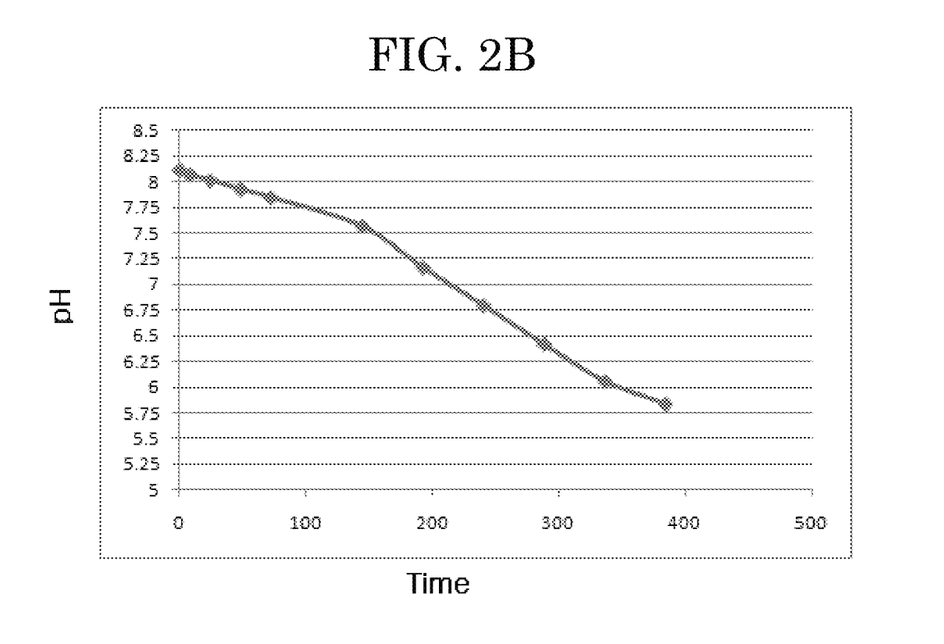
FIGS. 2B, 2D, 2F, 2H and 2J are graphs showing the change in pH over the time in Comparative Examples 1, 2, 3, 4 and 5, respectively.
Figure 2C:
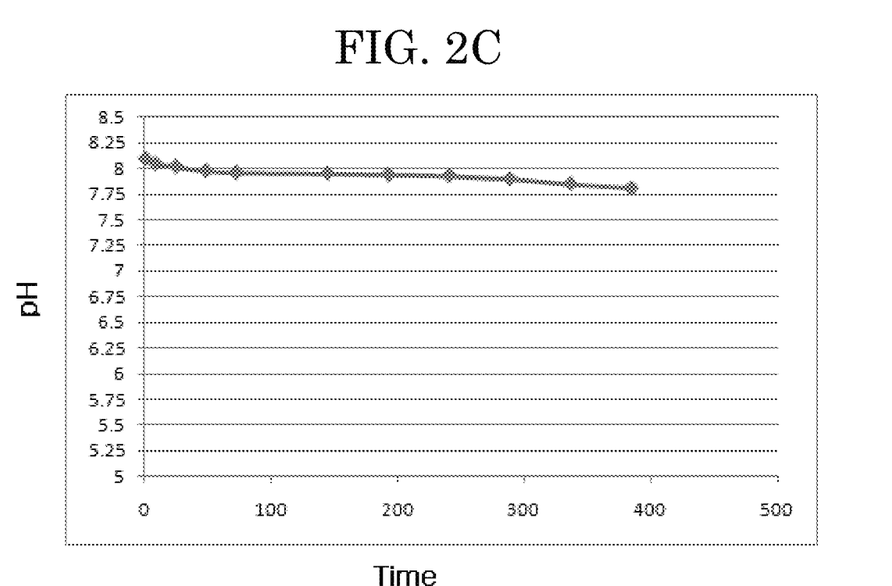
Figure 2D:
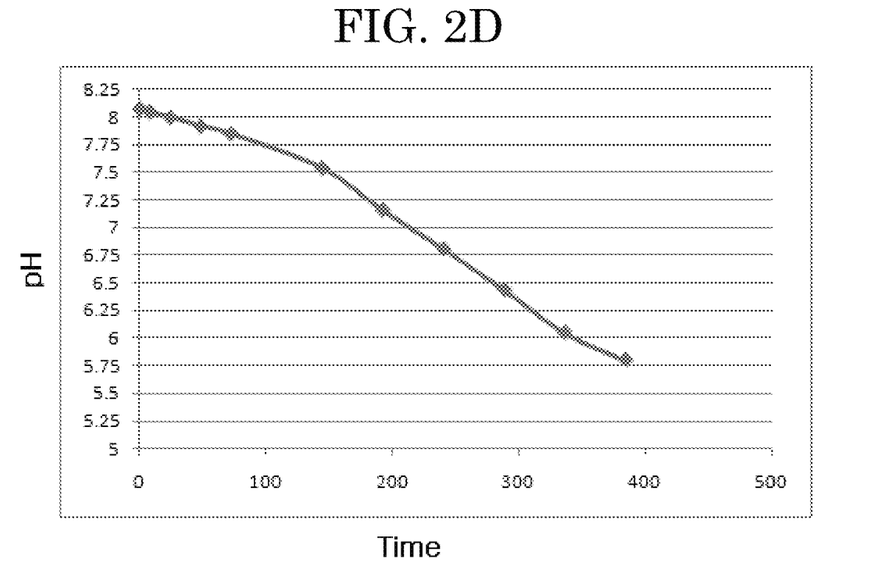
Figure 2E:
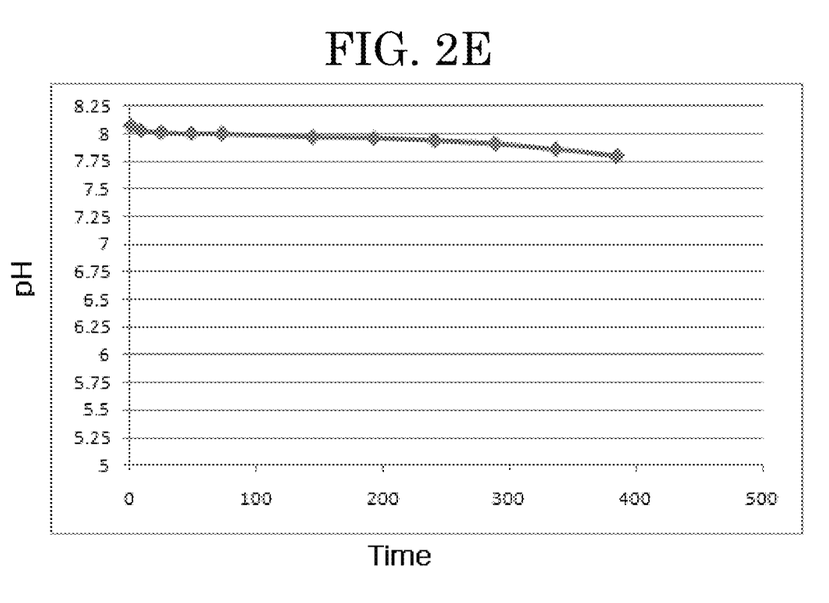
Figure 2F:
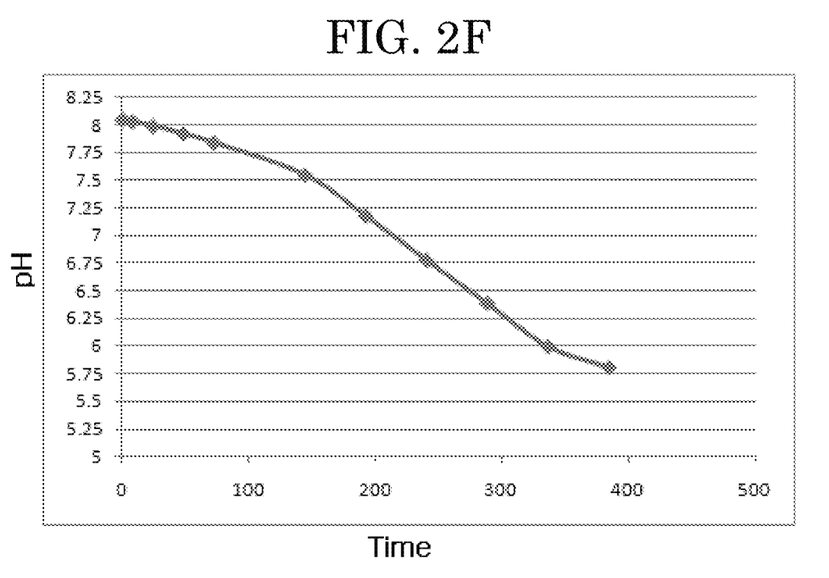
Figure 2G:
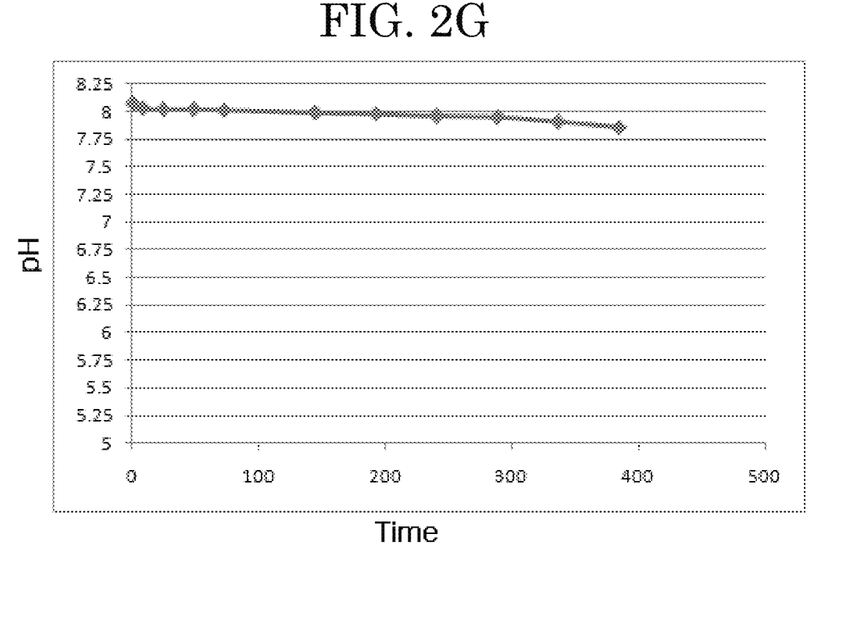
Figure 2H:
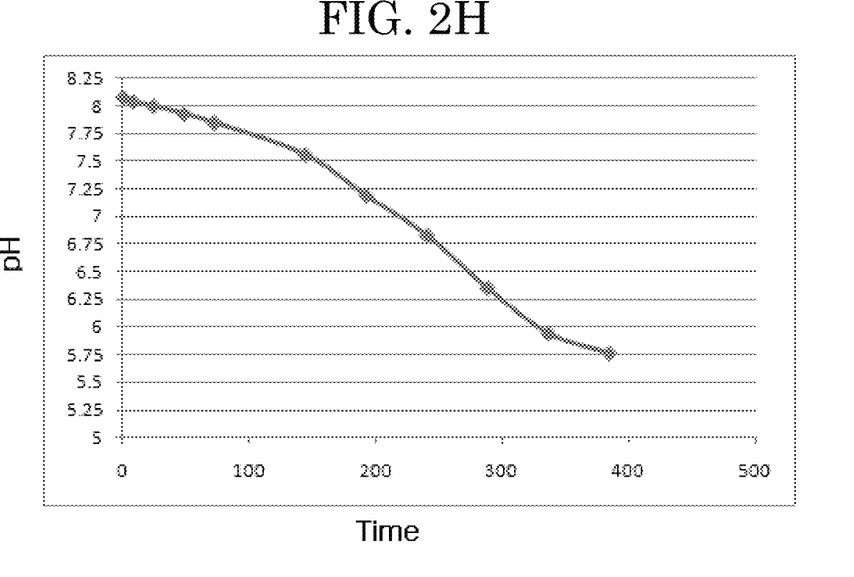
Figure 2I:
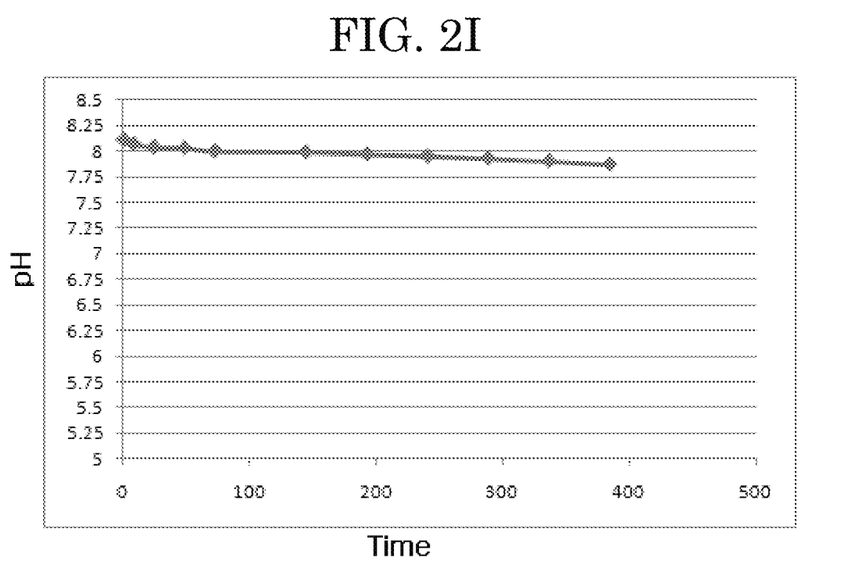
Figure 2J:
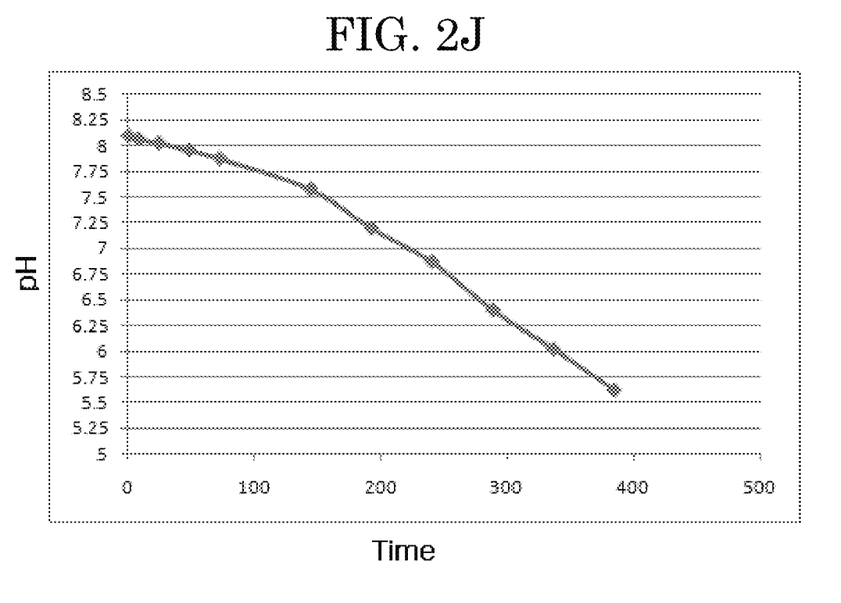

As can be confirmed from Table 8 above, the pH change, the reserve alkalinity change, and the concentration of metal ions eluted during the practical driving were generally significantly small. In addition, the weight changes of aluminum and solder test specimens were significantly small even in the metal corrosion test of the composition after the practical driving. Therefore, it can be seen that the metal anti-corrosive performance of the composition of the present invention was maintained even after the long-term driving of 200,000 km or longer. All the various kinds of parts in the cooling system were satisfactory without corrosion after the practical driving. FIG. 1 showed conditions of internal parts after the practical driving test.

As can be seen from the results of FIG. 1, the appearances of both the water pump impeller and the insides of tubes of the radiator made of aluminum were satisfactory. Therefore, it can be seen that the anti-corrosive effects on the internal metal parts were excellent even after the long-term practical driving.

The composition of the present invention was excellent in anti-corrosive effects on metals at a low concentration when being simultaneously used with the cyclohexane dicarboxylic acid and the ions of inorganic elements (e.g., strontium, barium, and manganese). Further, the composition of the present invention had excellent high-temperature thermal oxidative capability, leading to small changes in pH even during the long-term test. Further, the ions of inorganic elements of the compositions of the present invention suppress the elution of ions from surfaces of aluminum and solder metals, thereby improving the anti-corrosive performance at a low concentration. Further, the composition of the present invention had an improved pH buffering performance, thereby retaining the long-term durability of the antifreeze.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A composition for an antifreeze or a coolant, the composition comprising: (a) cyclohexane dicarboxylic acid; (b) an azole- or thiazole-based inhibitor; and (c) a metal of Group II, or VII element; wherein the cyclohexane dicarboxylic acid is one or a mixture of two or more selected from the group consisting of 1,4-cyclohexane dicarboxylic acid, 1,3-cyclohexane dicarboxylic acid, and 1,2-cyclohexane dicarboxylic acid.

2. The composition of claim 1, wherein the azole- or thiazole-based inhibitor is selected from the group consisting of tolyltriazole, benzotriazole, 4-phenyl-1,2,3-triazole, 2-naphthotriazole, 4-nitrobenzotriazole, and 2-mercaptobenzothiazole.

3. The composition of claim 1, wherein the Group II element is selected from the group consisting of barium (Ba), strontium (Sr), and magnesium (Mg).

4. The composition of claim 1, wherein the Group VII element is manganese (Mn).

5. The composition of claim 1, wherein the composition comprises cyclohexane dicarboxylic acid, an azole-based inhibitor; and a metal of Group II or VII element; wherein the cyclohexane dicarboxylic acid is one or a mixture of two or more selected from the group consisting of 1,4-cyclohexane dicarboxylic acid, 1,3-cyclohexane dicarboxylic acid, and 1,2-cyclohexane dicarboxylic acid.

6. A method for freeze prevention with corrosion protection and enhancement of pH buffering potency, comprising: applying to a cooling system a composition comprising: (a) cyclohexane dicarboxylic acid; (b) an azole- or thiazole-based inhibitor; and (c) a metal of Group II, or VII element; wherein the cyclohexane dicarboxylic acid is one or a mixture of two or more selected from the group consisting of 1,4-cyclohexane dicarboxylic acid, 1,3-cyclohexane dicarboxylic acid, and 1,2-cyclohexane dicarboxylic acid.

7. The method of claim 6, wherein the azole- or thiazole-based inhibitor is selected from the group consisting of tolyltriazole, benzotriazole, 4-phenyl-1,2,3-triazole, 2-naphthotriazole, 4-nitrobenzotriazole, and 2-mercaptobenzothiazole.

8. The method of claim 6, wherein the Group II element is selected from the group consisting of barium (Ba), strontium (Sr), and magnesium (Mg).

9. The method of claim 6, wherein the Group VII element is manganese (Mn).

10. The method of claim 6, wherein the composition comprises cyclohexane dicarboxylic acid, an azole-based inhibitor; and a metal of Group II or VII element; wherein the cyclohexane dicarboxylic acid is one or a mixture of two or more selected from the group consisting of 1,4-cyclohexane dicarboxylic acid, 1,3-cyclohexane dicarboxylic acid, and 1,2-cyclohexane dicarboxylic acid.

* * * * *